United States Patent
Kim et al.

(10) Patent No.: US 8,126,146 B2
(45) Date of Patent: Feb. 28, 2012

(54) METHOD OF QUANTUM CRYPTOGRAPHY USING BLIND PHOTON POLARIZATION QUIBITS WITH MULTIPLE STAGES

(75) Inventors: Chil-Min Kim, Daejeon (KR); Won-Ho Kye, Daejeon (KR); Young-Jai Park, Seoul (KR)

(73) Assignee: Paichai University Industry—Academic Cooperation Foundation

( * ) Notice: Subject to any disclaimer, the term of this patent is extended or adjusted under 35 U.S.C. 154(b) by 869 days.

(21) Appl. No.: 11/995,044

(22) PCT Filed: Jul. 7, 2006

(86) PCT No.: PCT/KR2006/002671
§ 371 (c)(1),
(2), (4) Date: Jul. 14, 2008

(87) PCT Pub. No.: WO2007/007996
PCT Pub. Date: Jan. 18, 2007

(65) Prior Publication Data
US 2009/0147955 A1  Jun. 11, 2009

(30) Foreign Application Priority Data
Jul. 8, 2005 (KR) .......................... 10-2005-0061888

(51) Int. Cl.
*H04K 1/00* (2006.01)
*H04L 9/08* (2006.01)
(52) U.S. Cl. ........................................ 380/256; 380/278
(58) Field of Classification Search .................. 380/256, 380/278
See application file for complete search history.

(56) References Cited

U.S. PATENT DOCUMENTS
2005/0089160 A1 * 4/2005 Crispin et al. .................. 380/28

OTHER PUBLICATIONS

Kye et al., Quantum Key Distribution with Blind Polarization Bases, Jul. 2005, Physical Review Letters, PRL 95, 040501, retrieved from the Internet <URL: prl.aps.org/abstract/PRL/v95/i4/e040501>, pp. 1-4 as printed.*
Bennett et al., Quantum Cryptography: Public Key Distribution and Coin Tossing, IEEE, 1984, retrieved from the Internet <URL:www.cs.ucsb.edu/~chong/290N-W06/BB84.pdf>, pp. 1-5 as printed.*
Muller et al., "Plug and play" systems for quantum cryptography, Applied Physics Letters, PRL 70, retrieved from the Internet <URL: apl.aip.org/resource/1/applab/v70/i7/p793_s1>, pp. 1-3 as printed.*

* cited by examiner

*Primary Examiner* — Saleh Najjar
*Assistant Examiner* — Michael Chao
(74) *Attorney, Agent, or Firm* — Jennifer Meredith, Esq.; Meredith & Keyhani, PLLC

(57) ABSTRACT

A cryptography method using a quantum phenomenon, which performs a multi-staged polarization process between a transmitter and a receiver to prevent a third party from knowing the polarization value of a photon. A transmitter rotates a photon flux by arbitrary angle θ and transmits it to a receiver. The receiver rotates the received photon flux by arbitrary angle φ and transmits it to the transmitter. The transmitter rotates the received photon flux by the reverse angle –θ of an angle, by which the transmitter 10 rotated it, then rotates it by polarization corresponding to an information bit, and transmits it to the receiver which rotates the received photon flux by the reverse angle –φ of an angle, and measures the polarization of the photon flux corresponding to the information bit, and recovers the information bit transmitted by the transmitter. Cryptography information may be transmitted using a plurality of photon fluxes.

12 Claims, 5 Drawing Sheets

METHOD OF QUANTUM CRYPTOGRAPHY USING BLIND PHOTON POLARIZATION QUIBITS WITH MULTIPLE STAGES

TECHNICAL FIELD

The present invention relates to a cryptography method using a quantum phenomenon and, more particularly, to a quantum cryptography method which performs a multi-staged polarization process between a transmitter and a receiver in order to prevent a third party from knowing the polarization value of a photon.

BACKGROUND ART

Light energy, the frequency of which is v, is given as an integer multiple of hv (where h is Planck's constant). When the value of a certain physical quantity is given as an integer multiple of a basic quantity (unit quantity), the basic quantity is called a quantum. That is, hv is a quantum. Furthermore, a quantum in the optical energy range is particularly called a photon.

Recently, a cryptography method using a quantum phenomenon started to be researched. The reason for this is that conventional cryptographic systems are established using mathematical methods, but, with the development of quantum computers, conventional cryptographic systems based on mathematical methods are starting to be exposed to risk, and thus a cryptographic system using the quantum phenomena of physics can be the alternative to them.

Figure 1:
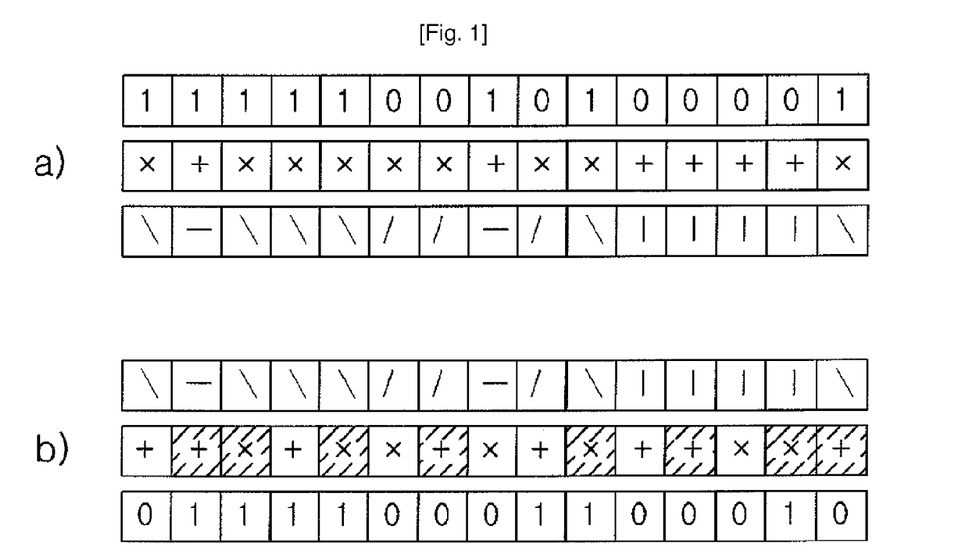
FIG. 1 is a diagram illustrating the concept of quantum cryptography.

FIG. 1 is a diagram illustrating a method of determining whether eavesdropping has occurred in a quantum cryptography scheme. In a quantum cryptographic transmission system, a cryptogram is transmitted in a way that makes it impossible to eavesdrop on the cryptogram.

The view a) of FIG. 1 denotes a transmitter and the b) of FIG. 1 denotes a receiver. The first row of a) of FIG. 1 is a plain text message which the transmitter desires to transmit, and the second row signifies polarization directions. That is, symbol × represents diagonal polarization and symbol + represents vertical/horizontal polarization. There is a 50-50 chance that a photon polarized in a diagonal direction will pass through a polarizing plate polarized in the horizontal direction or the vertical direction.

First, the transmitter and receiver ensure that information bit 0 is represented as vertical or /-diagonal polarization and information bit 1 is represented as horizontal or \-diagonal polarization.

The transmitter selects diagonal polarization or vertical/horizontal polarization to be used for each bit of a plain text message. As illustrated in the third row of a) of FIG. 1, the polarization direction of the first bit is selected as the diagonal direction and that of the second bit is selected as the vertical/horizontal direction. Then, the first bit 1 is encrypted in the \-directional polarization, and the second bit 1 is encrypted in the horizontal polarization.

The first row of the view b) of FIG. 1 represents signals received by the receiver. The signals received by the receiver are identical to those of the third row of the view a) of FIG. 1, and the second row of b) of FIG. 1 represents the polarization directions of the polarizing plate selected by the receiver to decrypt signals received from the transmitter. The third row of the view b) of FIG. 1 represents polarization directions measured through the polarizing plate selected by the receiver, that is, a decrypted plain text message.

The receiver randomly selects the direction of the polarizing plate to be used for the decryption of encrypted signals. As a result, the results of decryption may be correct or incorrect. When the receiver selects polarization directions identical to those of the transmitter, the bits of a plain text message are recovered without error. For example, the first bit of cipher text transmitted by the transmitter is \-directional polarization. In this case, if the receiver selects diagonal polarization and then a \-directional polarizing plate, the photon transmitted by the transmitter is detected with 100 percent certainty. If the receiver selects a diagonal direction and then the /-direction, the photon transmitted by the transmitter is not detected with 100 percent certainty. As a result, in either case, the receiver can be sure that the polarization direction of light that it has received is the \-direction.

However, as the example of b) of FIG. 1, the first bit of the cipher text transmitted by the transmitter is \-directional polarization (the first row of the first bit). If the receiver selects a vertical/horizontal direction (the second row of the first bit) and then uses a vertical polarizing plate or a horizontal polarizing plate, the probability that the polarization value set and transmitted by the transmitter will be acquired is ½. That is, the receiver may correctly or erroneously decrypt the polarization of a photon transmitted by the transmitter. In the example of b) of FIG. 1, incorrect results were obtained (the third row of the first bit).

The receiver randomly selects polarization directions as described above, and then decrypts the polarization values of the cipher text transmitted by the transmitter in its own way. Thereafter, the receiver selects several bits and notifies the transmitter of polarization directions used for the decryption of bits (bits represented in the second row of b of FIG. 1). Thereafter, the transmitter again notifies the receiver of bits among the bits which are transmitted from the receiver, which correspond to the directions of the selected polarizing plate. Through the above-described method, the transmitter and the receiver determine which bits must be delivered. In the example of the table, the second, third, fifth, tenth and twelfth bits are such bits.

Thereafter, the transmitter and the receiver compare these bits with each other. When eavesdropping has occurred, the polarization value of a photon polarized by the transmitter and transmitted to the receiver is changed. When the bits are all the same, it is certain that no eavesdropping has occurred. If there is a changed bit value, it is certain that eavesdropping has occurred between the transmission and reception of a cryptogram.

In such a quantum cryptography method, a photon is used as the means of delivering a quantum cryptogram. A single photon may be used, or a photon flux, which is a collection of photons, may be used.

When a third party attempting to eavesdrop on a cryptogram acquires a photon in the case in which a single photon is used as the means for delivering a quantum cryptograph, the photon which is being transmitted to the receiver immediately disappears, so that the receiver can immediately detect the violation by the third party. However, the single photon may appear or be changed due not only to an attack by a third party but for various reasons, such as light scattering, so that a cryptography method using a photon flux is generally used.

Figure 2:
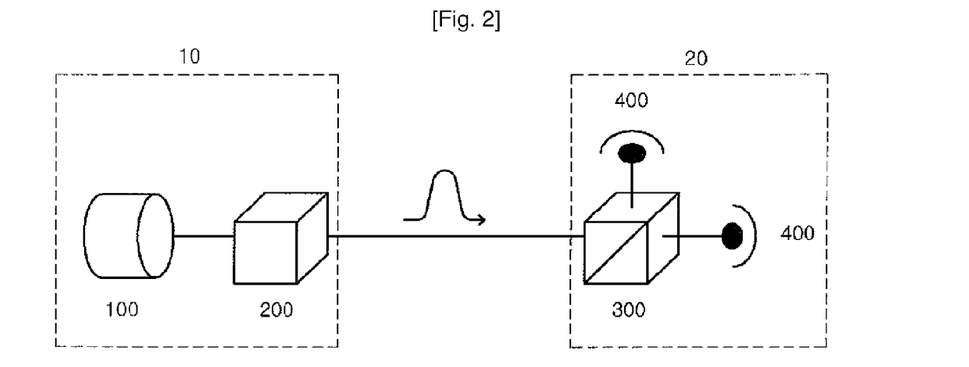
FIG. 2 is a diagram illustrating a conventional quantum cryptography method.

FIG. 2 is a quantum cryptography method using conventional technology. The conventional technology is described below with reference to the drawing.

In FIG. 2, a transmitter 10 sets vertical/horizontal polarization to 0 and π/2 for a photon flux emitted from a light source and diagonal polarization to −π/4 and π/4. When transmitting the photon flux to a receiver 20, the transmitter 10 randomly selects one state among four polarization states 0, π/2, −π/4 and π/4 for the polarization of the photon flux, and then transmits it. The receiver 20 measures the polarization of a received photon flux using a beam splitter 300 and a photo-detector 400.

When the transmission of the photon flux is finished, the transmitter 10 notifies the receiver 20 of the vertical/horizontal direction and the diagonal direction, which are polarization states of respective photon fluxes, rather than the polarization of each photon flux, and the receiver 20 notifies the transmitter 10 of values of the vertical/horizontal direction or the diagonal direction, which are polarization states that it has measured. Thereafter, the transmitter 10 and the receiver 20 take the same polarization states, and retrieve the values of the taken polarization states as information. That is, in the vertical/horizontal direction state, polarization 0 corresponds to information bit "0" and polarization $\pi/2$ corresponds to information bit "1". In the diagonal direction state, polarization $-\pi/4$ corresponds to information bit "0" and polarization $\pi/4$ corresponds to information bit "1".

Figure 3:
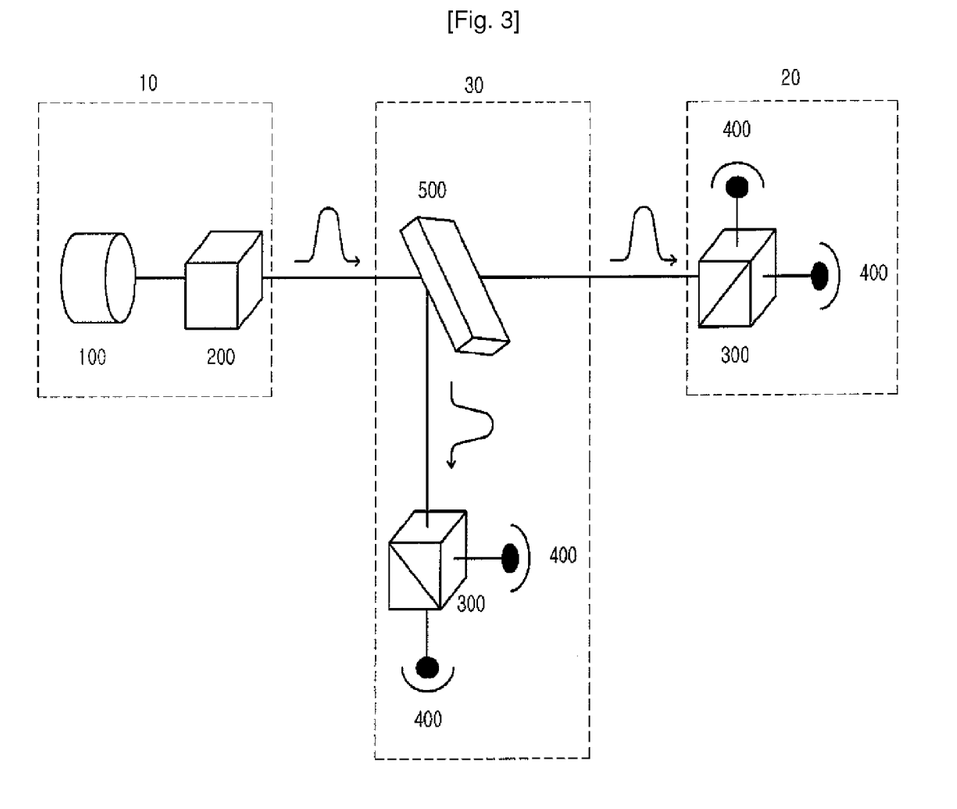
FIG. 3 is a diagram illustrating the case in which quantum encrypted information is acquired by a third party through beam-splitting attacks.

FIG. 3 is a diagram illustrating the method by which a third party acquires information in the quantum cryptography method using the conventional technology. In the above-described conventional quantum cryptography method using a photon flux, there is a problem in that information is easily acquired by a third party. The method in which the third party acquires information is described with reference to FIG. 3. First, there are the transmitter 10, the receiver 20 and the third party 30, who attempts to read transmission and reception information moving between the transmitter 10 and the receiver 20. When the transmitter 10 rotates the photon flux of the light source 100 to one of the four polarization states through a polarization rotator 200 and then transmits it to the receiver 20, as described in the above-described quantum cryptography method, the third party 30 acquires some of the polarized photon flux transmitted by the transmitter 10 using beam splitting 500. In the conventional technology, a photon flux has only one of four polarization states, so that the third party can determine the polarization value of the photon flux, which is transmitted to the receiver 20 by the transmitter 10, from some of the polarized photon flux acquired through the beam splitter 300 and the photo-detector 400.

Furthermore, since the conventional technology uses one photon flux, information may leak. That is, when the third party impersonates the receiver when communicating with the transmitter and impersonates the transmitter when communicating with the receiver, the third party can acquire all of the information between the transmitter and the receiver.

As described above, the quantum cryptography method using the conventional technology has a problem in that it is vulnerable to outside attacks, such as a beam-splitting attack or an impersonation attack.

DISCLOSURE OF INVENTION

Technical Problem

In order to resolve the above-described problems, the inventors of the present invention developed a quantum cryptography method of irregularly changing the polarization of a photon through multiple stages and then transmitting it. Also proposed is a method of resolving a problem in which encrypted information is leaked by a beam-splitting attack by a third party and which a conventional quantum cryptography method using a photon flux has, by using a photon polarized in an arbitrary direction having a random angle, rather than a vertical/horizontal direction or a diagonal direction.

Furthermore, a plurality of photon fluxes having a predetermined time delay is used, and then transmission and reception are performed, by selecting an arbitrary one from among them at transmission and reception steps, so that encrypted information is safely delivered despite an impersonation attack.

Technical Solution

In order to accomplish the above objects, the present invention provides a quantum cryptography method having multiple stages, including the steps of 1) a transmitter rotating polarization of a single photon or a photon flux by an arbitrary angle $\theta$ and transmitting it to a receiver, 2) the receiver rotating the single photon or the photon flux received from the transmitter by another arbitrary angle $\phi$ and transmitting it to the transmitter, 3) the transmitter rotating the single photon or the photon flux received from the receiver by $-\theta$, and then by an angle corresponding to information bit "0" or "1", and transmitting it to the receiver, and 4) the receiver rotating the single photon or the photon flux received from the transmitter by $-\phi$, and finally acquiring an information signal by reading the angle corresponding to information bit "0" or "1".

Meanwhile, it is preferred that, at the step 1), the transmitter changes the value of the $\theta$ for every transmission. Furthermore, at the step 2), the receiver changes a value of the $\phi$ for every transmission.

In the present invention, it is possible to add steps to this embodiment and perform it.

That is, a quantum cryptography method having multiple stages may include the steps of 1) a receiver rotating polarization of a single photon or a photon flux by an arbitrary angle $\psi$ and transmitting it to a transmitter, 2) the transmitter rotating the polarization of the single photon or the photon flux received from the receiver by an arbitrary angle $\theta$ and transmitting it to the receiver, 3) the receiver rotating the single photon or the photon flux received from the transmitter by an arbitrary angle $\phi$, and transmitting it to the transmitter, 4) the transmitter rotating the single photon or the photon flux received from the receiver by $-\theta$ and then by an angle corresponding to information bit "0" or "1", and transmitting it to the receiver, and 5) the receiver rotating the single photon or the photon flux received from the transmitter by $-(\psi+\phi)$ and finally acquiring an information signal by reading the angle corresponding to information bit "0" or "1".

In this embodiment, at the step 2), the transmitter may change a value of the $\theta$ for every transmission, and, at the step 1) or 3), the receiver may change a value of the $\psi$ or $\phi$ for every transmission.

Another embodiment of the present invention transmits a plurality of photons or a plurality of photon fluxes. That is, a quantum cryptography method having multiple stages according to this embodiment includes the steps of 1) a transmitter rotating polarization of a plurality of photons or a plurality of photon fluxes by arbitrary angles $\theta_1, \theta_2, \theta_3 \ldots$ and transmitting them to a receiver in sequence, 2) the receiver rotating the plurality of photons or the plurality of photon fluxes received from the transmitter by arbitrary angles ($\phi_1, \phi_2, \phi_3 \ldots$ and transmitting them to the transmitter in the identical sequence, 3) the transmitter respectively rotating the plurality of photons or the plurality of photon fluxes received from the receiver by arbitrary angles $-\theta_1, -\theta_2, -\theta_3 \ldots$, selecting one photon or one photon flux, rotating it by an angle corresponding to information bit "0" or "1", and transmitting it to the receiver, 4) the receiver storing the plurality of photons or the plurality of photon fluxes received from the transmitter, 5) the transmitter notifying the receiver of which photon or photon flux is selected and transmitted at the step 3), and 6) the receiver reversely rotating the stored plurality of photons or the plurality of photon fluxes by an angle corresponding to the selected photon or photon flux among the angles $\phi_1, \phi_2, \phi_3 \ldots$ based on received information about the selected photon or photon flux, and reading an information bit transmitted by the transmitter.

It is preferred that, at the step 3), when rotating and transmitting the selected photon or photon flux, the transmitter always transmits the selected photon or photon flux at a time corresponding to a fixed sequential position regardless of a sequential position thereof.

Furthermore, the transmitter and the receiver set a transmission period having a constant time before the step 1), and can perform the step 1) and steps following thereof in every set transmission period.

Furthermore, at the step 1), the transmitter may change values of the $\theta_1, \theta_2, \theta_3 \ldots$ for every transmission, and, at the step 2), the receiver may change values of the $(\phi_1, \phi_2, \phi_3 \ldots$ for every transmission.

Meanwhile, the steps 1) to 6) may be repeatedly performed for each information bit to be transmitted, and the steps 1) to 4) may be performed repeatedly for each of a plurality of bits to be transmitted, and then the steps 5) and steps 6) may be performed collectively for the plurality of bits.

Meanwhile, the present invention can be applied to a method of generating a encrypted bit stream between a transmitter and a receiver. That is, the method includes the steps of 1) the transmitter rotating polarization of a plurality of photons or a plurality of photon fluxes by arbitrary angles $\theta_1, \theta_2, \theta_3 \ldots$, and transmitting them to a receiver in sequence, 2) the receiver rotating the plurality of photons or the plurality of photon fluxes received from the transmitter by arbitrary angles $\phi_1, \phi_2, \phi_3 \ldots$, and transmitting them to the transmitter in the identical sequence, 3) the transmitter rotating the plurality of photons or the plurality of photon fluxes received from the receiver by arbitrary angles $-\theta_1, -\theta_2, -\theta_3 \ldots$, selecting one photon or one photon flux, rotating it by an angle corresponding to information bit "0" or "1", and transmitting it to the receiver, 4) the receiver selecting one angle $\phi_A$ of the photon flux angles $\phi_1, \phi_2, \phi_3 \ldots$, performing rotation by $-\phi_A$, and then reading polarization at that time, 5) the transmitter notifying the receiver of which photon or photon flux is selected and transmitted at the step 3), 6) the receiver determining whether the angle $\phi_A$ selected at the step 4) is an angle of a sequential position corresponding to the selected photon or photon flux received from the transmitter among $\phi_1, \phi_2, \phi_3 \ldots$, and notifying the transmitter of it, and 7) the transmitter and the receiver adding a corresponding information bit to an encrypted bit stream in when the angle $\phi_A$ selected at the step 4) is the angle of the sequential position corresponding to the selected single photon or photon flux. The steps can be repeatedly performed until a encrypted bit stream having a desired number of bits, for example, 128 bits is generated.

In this embodiment, an angle corresponding to information bit "0" and an angle corresponding to information bit "1" have a polarization angle difference of $\pi/2$ therebetween. Furthermore, it is preferred that at least two or more of angle pairs having a polarization angle difference of $\pi/2$ are used as the angle corresponding to information bit "0" and the angle corresponding to information bit "1". In this case, the step of transmitting information about which angle pair is used for transmission to the receiver after transmission of the information bit is further included.

In this embodiment, after the transmission of information has been completed, the steps of the transmitter acquiring a hash value of the transmitted information using a predetermined hash function, and the receiver determining a hash value of the received information, the transmitter determining whether transmitted information is delivered without error by comparing the acquired hash value with the hash value received from the receiver, and the receiver acquiring the hash value of the received information using a predetermined hash function, and determining whether the information bit received by itself is erroneous by comparing them with each other may be included.

ADVANTAGEOUS EFFECTS

The present invention provides a quantum cryptography method of rotating the polarization of photon fluxes using two or more photon fluxes and transmitting them at transmission and reception steps as described above, thereby being safe against all attacks on quantum encrypted information, such as beam-splitting attacks, impersonation attacks, or Trojan Horse attacks, unlike the conventional quantum cryptography method.

BEST MODE FOR CARRYING OUT THE INVENTION

Several embodiments of the present invention are described in detail with reference to the drawings below.

Figure 4:
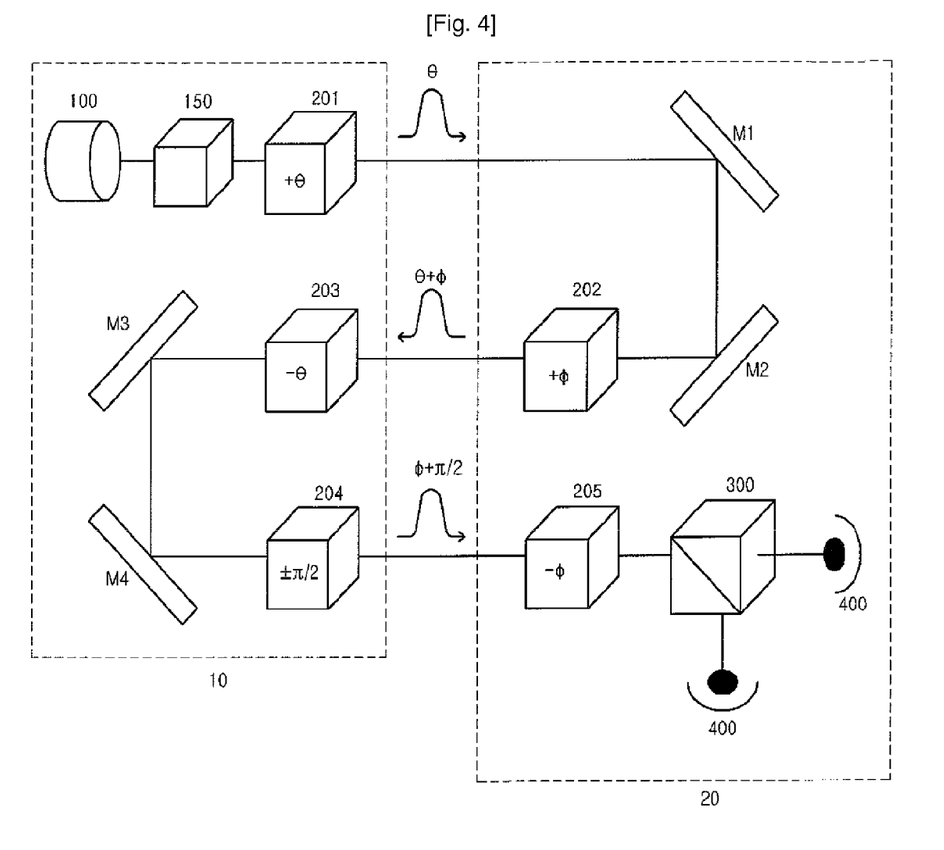
FIG. 4 is a diagram illustrating a method of transmitting and receiving quantum encrypted information while changing polarization in three stages using a photon flux according to the present invention.

FIG. 4 illustrates a quantum cryptography method using a photon flux having irregular polarization in three stages. With reference to FIG. 4, the quantum cryptography method is described below, with it being divided into three states depending on the change of polarization. At a first step, the transmitter 10 selects an arbitrary angle $\theta$ for polarization, rotates a photon flux emitted from a light source 100 by the certain angle $\theta$ to prevent a third party from determining the polarization angle, and transmits it to a receiver 20. The photon flux passes through an optical switch 150 and is polarized at the angle $\theta$ through a polarization rotator 201.

At a second step, the receiver 20 again rotates the photon flux polarized at the angle $\theta$, which is received from the transmitter 10, by a predetermined angle $\phi$ through a polarization rotator 202, and then transmits the photon flux, polarized at a total angle of $\theta+\phi$, to the transmitter 10 again. At a third step, the transmitter 10 receives the photon flux, polarized at the angle $\theta+\phi$, from the receiver 20, and then rotates the polarization of the photon flux by the reverse angle of $\theta$, by which the transmitter 10 rotated the photon flux at the first step, through the polarization rotator 203. Thereafter, the photon flux is in a state of having been rotated by $\phi$ by the receiver at the second step. Thereafter, the transmitter 10 rotates the photon flux, which is rotated by φ, by ±π/4, 0 or π/2 through the polarization rotator so as to correspond to information bits "0" and "1", and then transmits it to the receiver 20.

The polarization values corresponding to the information bits have the polarization angle difference of π/2 therebetween when the information bits are "0" and "1". That is, when the photon flux is rotated by 0 through the polarization rotator in the case in which the information bit is "0" (that is, polarization is not performed), a polarization value corresponding to the information bit "1" is rotated by π/2. In FIG. 4, the transmission of a photon flux, rotated by π/2, to the receiver is illustrated.

The receiver 20 rotates the polarization of the received photon flux, rotated by φ+π/2, by the reverse angle (−φ) of the angle φ, by which the receiver 20 itself rotates the photon flux at the second step, through a polarization rotator 205. Thereafter, the photon flux has only polarization which is rotated by π/2 so as to have information corresponding to "0" or "1". The receiver 20 can know the information value transmitted by the transmitter 10 by reading the polarization value of the photon flux.

Meanwhile, at least two of angle pairs, for example, (0, π/2), (π/4, −π/4), (π/8, −7π/8), which have a polarization angle difference of π/2 therebetween, can be used as an angle corresponding to information bit "0" and an angle corresponding to "1". That is, the transmitter selects one of a predetermined number of angle pairs and rotates it by an angle corresponding to an information bit whenever the transmitter transmits the information bit. Furthermore, the transmitter transmits information about the angle pair used for transmission to the receiver after the transmission of the information bit. For example, if an angle pair (π/4, −π/4) is selected, the transmitter performs rotation by π/4 at the time of transmitting information bit "0", and then notifies the receiver of the fact that the angle pair (π/4, −π/4) has been selected. Therefore, the receiver can read the information bit based on the corresponding angle pair.

Although a description has been made above of the method of transmitting and receiving information while changing the polarization of a photon flux in three stages between a transmitter and a receiver, it is also possible to exchange information between the transmitter and the receiver while changing the polarization of a photon flux in more than 3 stages.

For example, before transmission by a transmitter to a receiver, a step in which the receiver previously rotates the polarization of a single photon or a photon flux by an arbitrary angle ψ and transmits it to the transmitter may be additionally performed. In this case, the receiver rotates the photon or the photon flux, which is received from the transmitter, by −(ψ+φ), and finally reads an angle corresponding to information bit "0" or "1".

Meanwhile, the present invention can be applied to the case of transmitting information using a plurality of photon fluxes or photons.

Figure 5:
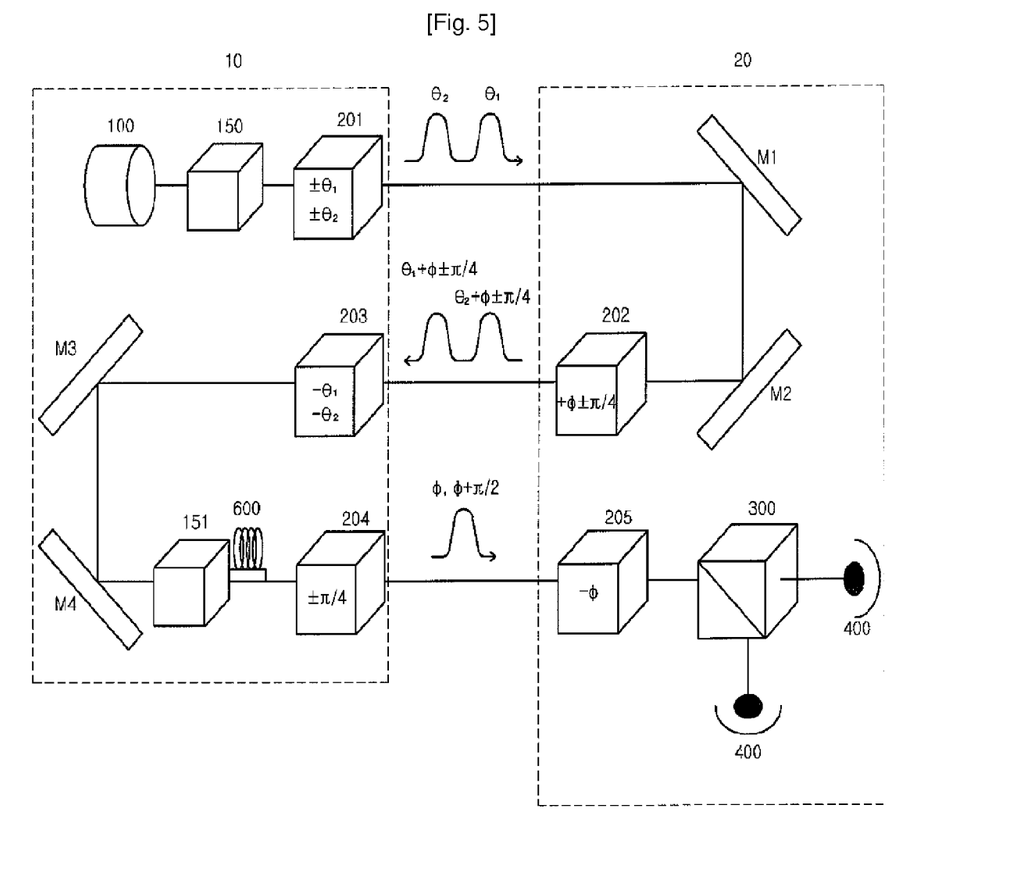
FIG. 5 is a diagram illustrating a method of transmitting and receiving quantum encrypted information while changing polarization in three stages using two photon fluxes according to the present invention.

FIG. 5 is a diagram illustrating a quantum cryptography method having three stages using two photon fluxes.

At a first step, a transmitter 10 passes two photon fluxes emitted from a light source 100 through an optical switch 150 and a polarization rotator 201, polarizes two photon fluxes at $\theta_1$ and $\theta_2$ respectively, or both at θ, and transmits them to a receiver 20.

At a second step, the receiver 20 further polarizes the two photon fluxes, having been polarized at $\theta_1$ and $\theta_2$ respectively, or both at θ, by arbitrary angles $\phi_1$ or $\phi_2$, for example, φ+π/4 or φ−π/4, through a polarization rotator 202. Thereafter, the two photon fluxes polarized at $\theta_1$+φ±π/4 and $\theta_2$+φ±π/4 are again transmitted to the transmitter 10.

Thereafter, at a third step, the transmitter 10 respectively polarizes the two photon fluxes, having been polarized at $\theta_1$+φ±π/4 and $\theta_2$+φ±π/4, at reverse angles (−$\theta_1$, −$\theta_2$) of the angles $\theta_1$ and $\theta_2$, by which the transmitter 10 itself rotated the photon fluxes at the first step, using a polarization rotator 203. Then, the photon fluxes are in states of having been polarized at φ+π/4 and φ−π/4. Thereafter, the transmitter 10 selects one of the two photon fluxes by passing them through an optical switch 151, perform time delay on the selected one using a delay device 600, and rotates the photon flux by −π/4 or π/4 through a polarization rotator 204 so as to correspond to information bit "0" or "1" (as described in FIG. 4, rotation by −π/2, 0 or π2 may be performed), which is then transmitted to the receiver. In this case, the transmitter 10 delays the photon flux by a multiple of a transmission period between two photon fluxes and then transmits it, or always transmits it at a time corresponding to any one of two photon fluxes in order to prevent a third party from measuring the time delay and determining the selected and transmitted photon flux.

Furthermore, in the case of information bit "1", the polarization value corresponding to the information bit is rotated by −π/4 through the polarization rotator, and, in the case of information bit "0", the polarization value is rotated by π/4. In FIG. 5, it is illustrated as having been rotated by π/4 and transmitted. The selected photon flux finally has a polarization value rotated by φ or φ±π/2. Thereafter, the receiver 20 rotates the received photon flux by the reverse angle (−φ) of the angle by which the receiver polarized it at the second step, and then reads the polarization of the photon flux through a polarized beam splitter 300 and a photo-detector 400. After the transmission of information has been completed, the transmitter notifies the receiver of the selected and transmitted photon flux through a traditional transmission path. The receiver can acquire the precise encrypted signal of the photon flux transmitted by the transmitter.

Meanwhile, when this embodiment is generally expanded, it can be implemented by performing steps of 1) a transmitter rotating the polarization of a plurality of photons or a plurality of photon fluxes by arbitrary angles $\theta_1, \theta_2, \theta_3$ ... and transmitting them to a receiver in sequence, 2) the receiver rotating the plurality of photons or the plurality of photon fluxes received from the transmitter by arbitrary angles $\phi_1, \phi_2, \phi_3$ ... and transmitting them to the transmitter in the identical sequence, 3) the transmitter respectively rotating the plurality of photons or the plurality of photon fluxes received from the receiver by angles $-\theta_1, -\theta_2, -\theta_3$ ..., selecting one photon or one photon flux, rotating it by an angle corresponding to information bit "0" or "1" and transmitting it, 4) the receiver storing the plurality of photons or the plurality of photon fluxes received from the transmitter, 5) the transmitter notifying the receiver of the photon or photon flux selected and transmitted at the step 3), 6) the receiver reversely rotating the stored plurality of photons or the plurality of photon fluxes by the angle corresponding to the selected photon or photon flux among the $\phi_1, \phi_2, \phi_3$ ... based on the received information about the selected photon or photon flux, and reading the information bit transmitted by the transmitter.

Meanwhile, the present invention can be applied to the generation of a encrypted bit stream. That is, 1) when a transmitter rotates the polarization of a plurality of photons or a plurality of photon fluxes by arbitrary angles $\theta_1, \theta_2, \theta_3$ ... and transmits them to a receiver in sequence, 2) the receiver rotates the plurality of photons or the plurality of photon fluxes, received from the transmitter, by arbitrary angles $\phi_1, \phi_2, \phi_3$ ... and transmits them to the transmitter in the identical sequence, and 3) the transmitter rotates the plurality of photons or the plurality of photon fluxes, received from the receiver, by arbitrary angles $-\theta_1, -\theta_2, -\theta_3 \ldots$, selects one photon or one photon flux, rotates it by an angle corresponding to information bit "0" or "1" and transmits it. 4) Thereafter, the receiver selects one angle $\phi_A$ from among the angles $\phi_1, \phi_2, \phi_3 \ldots$, performs rotation by $-\phi_A$, and then reads polarization at that time. 5) The transmitter notifies the receiver of the photon or photon flux selected and transmitted at step 3). 6) Then, the receiver determines whether the angle $\phi_A$ selected at step 4) is the angle of an a sequential position corresponding to the selected photon or photon flux received from the transmitter, among $\phi_1, \phi_2, \phi_3 \ldots$, and notifies the transmitter thereof. For example, if the receiver selects $\phi_2$ at step 4) and the transmitter selects the photon flux corresponding to $\phi_3$, the receiver cannot read an information bit transmitted by the transmitter. In contrast, if the receiver selects $\phi_2$ at step 4) and the transmitter selects the photon flux corresponding to $\phi_2$, the receiver will correctly read an information bit transmitted by the transmitter. Therefore, which information bit among information bits transmitted to the receiver by the transmitter has been properly delivered to the receiver can be checked based on this information. 7) Thereafter, the information bit delivered without error, that is, the information bit corresponding to the case where the angle $\phi_A$ selected at step 4) is the angle of a sequential position corresponding to the selected single photon or photon flux, is added to the encrypted bit stream by the transmitter and the receiver. Furthermore, the above-described steps are repeatedly performed until the encrypted bit stream having the desired number of bits, for example, 128 bits, is generated, thereby generating a encrypted bit stream having the desired number of bits.

In those embodiments, the angle corresponding to information bit "0" and the angle corresponding to "1" have a polarization angle difference of $\pi/2$ therebetween. Furthermore, it is preferred that at least two of angle pairs having a polarization angle difference of $\pi/2$ be used as the angle corresponding to information bit "0" and the angle corresponding to "1". This case further includes the step in which the transmitter notifies the receiver of information about respective angle pairs used for transmission after the transmission of an information bit.

Furthermore, in those embodiments, after the transmission of information has been completed, a step in which the transmitter acquires the hash value of the transmitted information using a predetermined hash function and the receiver acquires the hash value of received information, a step in which the transmitter determines whether the transmitted information bit has been delivered without error by comparing its own hash value with the hash value received from the receiver, and a step in which the receiver acquires the hash value of the information it has received using a predetermined hash function and determines whether the information bit it has received is erroneous by comparing them with each other, may be further included.

When the above-described quantum cryptography method having multiple stages according to the present invention is used, information leakage due to the beam-splitting attack by a third party can be prevented.

The reason for this is that, when a transmitter rotates polarizations of photons by arbitrary angles and then transmits them according to the present invention, a third party must individually measure all of the polarizations of the large number of photons existing in a photon flux and then determine all of the large number of vertically polarized photons and the large number of horizontally polarized photons in order to determine the angle of an arbitrarily polarized photon flux. If the polarization angle of the photon flux is not completely identical to the polarization angle of measuring equipment when the polarization of the photon flux, polarized at an arbitrary angle, is measured, a measurer may randomly read the polarization angle of the photon flux in a vertical direction or in a horizontal direction. In other words, merely by measuring the polarizations of some photons of a photon flux, the polarization angle of the photon flux cannot be determined. That is, in order for a third party to determine the polarization of a photon flux, many photons must be extracted from the photon flux and then the respective polarizations of the photons must be determined.

A third party acquires the polarization information of a transmitted and received photon flux using a beam-splitting attack, which can be expressed as the following equation.

First, the amplitude a of a pulse in a coherent-state is given as follow.

$$|\alpha> = \exp(-\alpha^2/2) \sum_{\eta=0} \alpha^\eta/\sqrt{n!} |n>$$

where $|n>$ is the photon-number eigenstate.

The average photo number of the magnitude is given as $\alpha^2$. When the efficiency of one-directional transmission between a transmitter and a receiver is $\eta$, the number of photons which can be acquired through the beam-splitting attack between the transmitter and the receiver by the third party becomes $\sqrt{1-\eta^2}\alpha$.

In the method of the present invention having three stages, the probability distribution of the average number (1 $\sqrt{1-\eta^2}\alpha>$) of photons which can be acquired by the third party in the path from the transmitter to the receiver, which is a first step, is given as the following equation:

$$P_1(n) = \exp[-(1-\eta^2)\alpha^2] \frac{[(1-\eta^2)\alpha^2]^n}{n!}$$

Therefore, the amount of information that can be acquired by the third party is indicated by the following equation:

$$I_1 = \sum_{\eta=0} P_1(n) I(n)$$

In this case, I(n) is a state evaluation function optimized for n spin states placed in a two-dimensional plane, and given as the following equation.

$$I(n) = \frac{1}{2} + \frac{1}{2^{\eta+1}} \sum_{l=0}^{\eta-1} \sqrt{\left|\frac{n}{l}\right|\left|\frac{n}{l+1}\right|}$$

Using the same method, the probability distribution of information which can be acquired by the third party at the second step of the present invention is given by the following equation.

$$P_2 = \exp[-\eta^2(1-\eta^2)\alpha^2]\frac{[(\eta^2(1-\eta^2)\alpha^2)]^n}{n!}$$

Using the same method, the probability distribution of information which can be acquired by the third party at the third step of the present invention is given by the following equation.

$$P_3(n) = \exp[-\eta^4(1-\eta^2)\alpha^2]\frac{[\eta^4(1-\eta^2)\alpha^2]^n}{n!}$$

As a result, using the same method, The maximum values of information which can be acquired by the third party at the second and third steps of the present invention, respectively, are given as the following equations.

$$I_2 = \hat{Q}_{n=0} P_2(n)I(n)$$

$$I_3 = \hat{Q}_{\eta=0} P_3(n)I(n)$$

The absolute amount of information which can be acquired by the third party is given as the minimum value of information at each step.

As a result, the maximum amount of information which can be acquired by the third party can be determined using the following equation.

$$I_E = \min(I_1, I_2, I_3)$$

Figure 6:
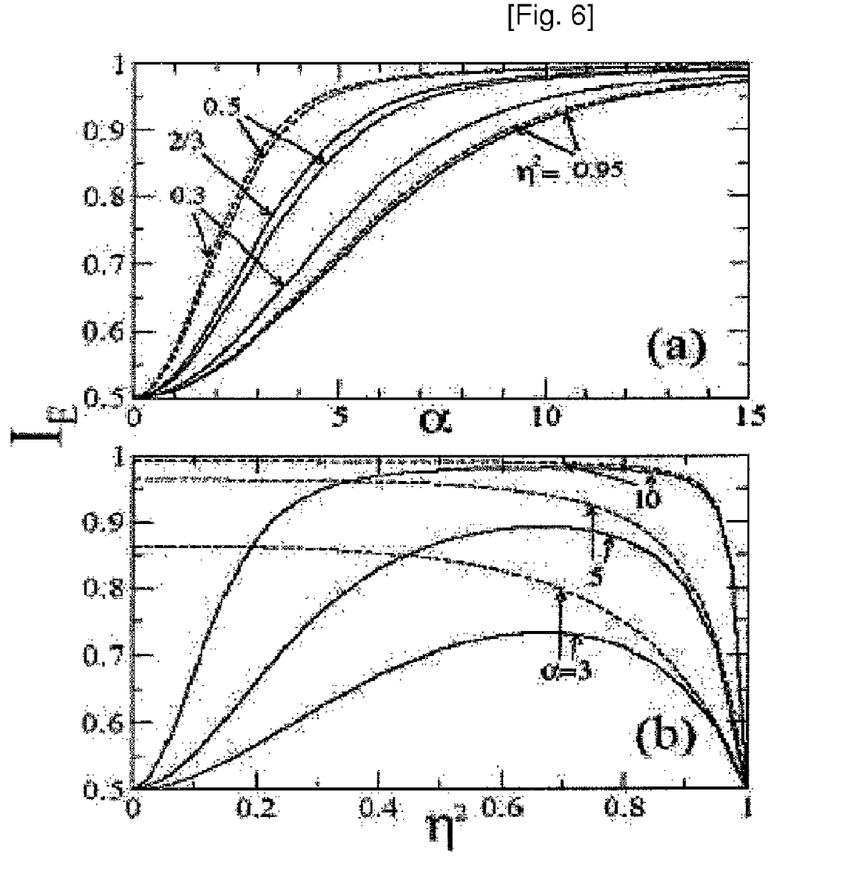
FIG. 6 is a diagram illustrating the maximum amount of information about photons which a third party on a transmission/reception path can acquire in a beam-splitting attack.

FIG. 6 is a diagram illustrating the maximum amount of information of photons which a third party on a transmission/reception path can acquire using a beam-splitting attack.

Solid lines represent the amounts of information acquired by the third party in the case in which the intensities of a transmitted/received photon flux are verified in respective steps of the present invention, and the dotted line represents the amount of information acquired by the third party in the case in which the intensity of a transmitted/received photon flux is measured and verified only at the last step of the present invention.

It can be known that, from the solid lines, the amount of information of photons acquired by the third party has a maximum at $\eta^2 = 2/3$. For example, when $\alpha=3$, the maximum amount of information of photons acquired by the third party is $I_E(0.7)$. It is evident that, when the efficiency of one-directional transmission is bad ($\eta^2 \to 0$), or good ($\eta^2 \to \to 1$), the maximum amount of information of photons that can be acquired by the third party converges at $I_E(0.5)$, so that half of the amount of information transmitted to the receiver by the transmitter can be acquired. In the case of dotted lines, when the intensity of a transmitted/received photon flux is verified only at the last step in the present invention, the third party can acquire a relatively larger amount of information. For example, when $\eta^2=0.5$ and $\alpha=2.83$, $I_E(0.83)$.

Therefore, it is impossible in practice for the amount of information of photons that can be acquired from a polarized photon flux at an arbitrary angle between the transmitter and the receiver by the third party to be 1 (that is, not all of the photon information can be determined), meaning that it is impossible to always determine the polarization value of a photon flux polarized at an arbitrary angle at transmission/reception steps.

As a result, when using the present invention, which changes the polarization state of a photon flux at transmission/reception steps, a third party cannot determine all of the information between a transmitter and a receiver even when attempting to perform the beam-splitting method.

An impersonation attack is another method of acquiring quantum encrypted information by a third party. The impersonation attack is an eavesdropping method in which the third party on the transmission and reception paths of encrypted information impersonates the receiver when communicating with the transmitter and the transmitter when communicating with the receiver, thereby acquiring all information transmitted and received on the transmission and reception paths.

However, the method of transmitting and receiving quantum encrypted information while changing polarization for each step using two or more photon fluxes uses two or more photon fluxes to transmit information about one bit. The two or more photon fluxes are polarized at arbitrary angles at respective transmission and reception steps, and are then transmitted and received. In this case, a third party using an impersonation attack impersonates the receiver when communicating with the transmitter, and the transmitter when communicating with the receiver, but does not know the polarization values of the respectively polarized photon fluxes, so that the third party delivers the two or more polarized photon fluxes received from the transmitter to the receiver, and delivers the two or more polarized photon fluxes received from the receiver to the transmitter. However, at the last step of the present invention, the transmitter selects an arbitrary one of the two or more polarized photon fluxes, adds a delay of a multiple of the transmission period of the two or more photon fluxes, performs rotation by a polarization value corresponding to an information bit, and then transmits only the selected photon flux to the receiver. At the above-described last step, since the third party does not know which photon flux was selected by the transmitter and transmitted to the receiver, the correct selected photon flux cannot be transmitted to the receiver. Therefore, an error occurs in the delivery of quantum encrypted information between the transmitter and the receiver. When the error occurs in the delivery of quantum encrypted information between the transmitter and the receiver, the transmitter and receiver are made aware of the access to information by the third party upon the delivery of encrypted information. As a result, the method of transmitting and receiving quantum encrypted information while changing polarization for each step using two or more photon fluxes is safe because the impersonation attack by the third party can be made known.

Next, there is a method called a Trojan Horse attack, which is a method in which a third party acquires quantum encrypted information. The Trojan Horse attack is a method in which the third party determines a polarization value by inserting a pseudo photon flux into a photon flux which is polarized to have a specific encrypted value and is then transmitted and received. In the method of the present invention, which changes the polarization of a photon flux for each step, the third party must insert a photon flux stronger than the photon flux in order to use the above-described Trojan Horse attack. However, in this case, the intensity of the photon flux used for the Trojan Horse attack is greater than the intensity of the photon flux used for the transmission and reception of the present invention, so that the transmitter and receiver can be made aware of the existence of the Trojan Horse attack by the third party.

The invention claimed is:

1. A quantum cryptography method having multiple stages, comprising the steps of:
   1) a receiver rotating polarization of a single photon or a photon flux by an arbitrary angle .psi. and transmitting it to a transmitter,
   2) the transmitter rotating the polarization of the single photon or the photon flux received from the receiver by an arbitrary angle .theta. and transmitting it to the receiver,
   3) the receiver rotating the single photon or the photon flux received from the transmitter by an arbitrary angle .phi., and transmitting it to the transmitter,
   4) the transmitter rotating the single photon or the photon flux received from the receiver by —.theta. and then by an angle corresponding to information bit "1" or "1", and transmitting it to the receiver,
   5) the receiver rotating the single photon or the photon flux rived from the transmitter by —(.psi.+.phi.) and finally acquiring an information signal by reading the angle corresponding to information bit "0" or "1",
   6) the transmitter acquiring a hash value of transmitted information using a pre-determined hash function, and the receiver determining a hash value of received information,
   7) the transmitter determining whether the transmitted information is delivered without error by comparing the acquired hash value with the hash value received from the receiver, and
   8) the receiver acquiring the hash value of the received information using a pre-determined hash function, and determining whether an information bit received by itself is erroneous by comparing them with each other.

2. The quantum cryptography method as set forth in claim 1, wherein the angle corresponding to information bit "1" and the angle corresponding to information bit "1" have a polarization angle difference of .pi./2 therebetween.

3. The quantum cryptography method as set forth in claim 2, wherein at least two or more of angle pairs having a polarization angle difference of .pi./2 are used as the angle corresponding to information bit "0" and the angle corresponding to information bit "1", and further comprising the step of transmitting information about which angle pair is used for transmission to the receiver after transmission of the information bit.

4. The quantum cryptography method as set forth in claim 1, wherein, at the step 2), the transmitter changes a value of the .theta. for every transmission.

5. The quantum cryptography method as set forth in claim 1, wherein, at the step 1) or 3), the receiver changes a value of the .psi. or .phi. for every transmission.

6. A method of generating a encrypted bit stream between a transmitter and a receiver, comprising the steps of:
   1) the transmitter rotating polarization of a plurality of photons or a plurality of photon fluxes by arbitrary angles .theta..sub.1, .theta..sub.2, .theta..sub.3 . . . , and transmitting them to a receiver in sequence,
   2) the receiver rotating the plurality of photons or the plurality of photon fluxes received from the transmitter by arbitrary angles .phi..sub.1, .phi..sub.2, .phi..sub.3 . . . , and transmitting them to the transmitter in the identical sequence,
   3) the transmitter rotating the plurality of photons or the plurality of photon fluxes received from the receiver by the arbitrary angles -.theta..sub.1, -.theta..sub.2, -.theta..sub.3 . . . , selecting one photon or one photon flux, rotating it by an angle corresponding to information bit "1" or "1", and transmitting it to the receiver,
   4) the receiver selecting one angle .phi..sub.A of the photon flux angles .phi..sub.1, .phi..sub.2, .phi..sub.3 . . . , performing rotation by -.phi..sub.A, and then reading polarization,
   5) the transmitter notifying the receiver of which photon or photon flux is selected and transmitted at the step 3),
   6) the receiver determining whether the angle .phi..sub.A selected at the step 4) is an angle of a sequential position corresponding to the selected photon or photon flux received from the transmitter among .phi..sub.1, .phi..sub.2, .phi..sub.3 . . . , and notifying the transmitter of it, and
   7) the transmitter and the receiver adding a corresponding information bit to an encrypted bit stream in when the angle .phi..sub.A selected at the step 4) is the angle of the sequential position corresponding to the selected single photon or photon flux.
   8) the transmitter acquiring a hash value of the transmitted information using a pre-determined hash function, and the receiver determining a hash value of the received information,
   9) the transmitter determining whether transmitted information is delivered without error by comparing the acquired hash value with the hash value received from the receiver, and
   10) the receiver acquiring the hash value of the received information using a pre-determined hash function, and determining whether the information bit received by itself is erroneous by comparing them with each other.

7. The quantum cryptography method as set forth in claim 6, wherein the angle corresponding to information bit "0" and the angle corresponding to information bit "1" have a polarization angle difference of .pi./2 therebetween.

8. The quantum cryptography method as set forth in claim 7, wherein at least two or more of angle pairs having a polarization angle difference of .pi./2 are used as the angle corresponding to information bit "0" and the angle corresponding to information bit "1", and further comprising the step of transmitting information about which angle pair is used for transmission to the receiver after transmission of the information bit.

9. The quantum cryptography method as set forth in claim 6, wherein, at the step 3), when rotating and transmitting the selected photon or photon flux, the transmitter always transmits the selected photon or photon flux at a time corresponding to a fixed sequential position regardless of a sequential position thereof 10. The quantum cryptography method as set forth in claim 6, wherein the transmitter and the receiver set a transmission period having a constant time before the step 1), and perform the step 1) and following steps thereof in every set transmission period.

11. The quantum cryptography method as set forth in claim 6, wherein at the step 1), the transmitter changes values of the .theta..sub.1, .theta..sub.2, .theta..sub.3 . . . for every transmission.

12. The quantum cryptography method as set forth in claim 6, wherein at the step 2), the receiver changes values of the .phi..sub.1, .phi..sub.2, .phi..sub.3 . . . for every transmission.

* * * * *